US008180525B2

United States Patent
Lüke et al.

(10) Patent No.: US 8,180,525 B2
(45) Date of Patent: May 15, 2012

(54) METHOD AND SYSTEM FOR ASSISTING A DRIVER WHEN PARKING OR MANEUVERING A MOTOR VEHICLE

(75) Inventors: Stefan Lüke, Olpe (DE); Andreas Köbe, Bensheim (DE); Martin Griesser, Eschborn (DE); Markus Irth, Mainz-Kastel (DE); Daniel Fischer, Schwalbach (DE); Frank Schreiner, Friedrichsdorf (DE); Christian Sussmann, Oberursel (DE)

(73) Assignee: Continental Teves AG & Co. oHG (DE)

( * ) Notice: Subject to any disclaimer, the term of this patent is extended or adjusted under 35 U.S.C. 154(b) by 828 days.

(21) Appl. No.: 12/158,418

(22) PCT Filed: Dec. 19, 2006

(86) PCT No.: PCT/EP2006/069937
§ 371 (c)(1),
(2), (4) Date: Nov. 19, 2008

(87) PCT Pub. No.: WO2007/074113
PCT Pub. Date: Jul. 5, 2007

(65) Prior Publication Data
US 2009/0125181 A1    May 14, 2009

(30) Foreign Application Priority Data

| Dec. 23, 2005 | (DE) | 10 2005 062 367 |
| Dec. 23, 2005 | (DE) | 10 2005 062 369 |
| Dec. 23, 2005 | (DE) | 10 2005 062 371 |
| Nov. 27, 2006 | (DE) | 10 2006 055 847 |
| Dec. 19, 2006 | (DE) | 10 2006 060 456 |
| Dec. 19, 2006 | (DE) | 10 2006 060 457 |

(51) Int. Cl.
*G06F 7/00* (2006.01)

(52) U.S. Cl. .............. 701/36; 701/25; 701/93

(58) Field of Classification Search ............ 180/199; 280/761; 340/932.2; 701/36, 25, 93
See application file for complete search history.

(56) References Cited

U.S. PATENT DOCUMENTS

| 5,742,141 | A * | 4/1998 | Czekaj ............... 318/587 |
| 6,304,808 | B1 * | 10/2001 | Milot ............... 701/91 |
| 6,622,810 | B2 * | 9/2003 | Labuhn et al. ........ 180/169 |
| 6,971,070 | B2 * | 11/2005 | Obradovich ........... 715/835 |
| 7,039,504 | B2 * | 5/2006 | Tanaka et al. ......... 701/1 |
| 7,043,346 | B2 * | 5/2006 | Kubota et al. ........ 701/28 |
| 7,085,634 | B2 * | 8/2006 | Endo et al. ........... 701/36 |
| 7,089,101 | B2 * | 8/2006 | Fischer et al. ........ 701/41 |
| 7,155,325 | B2 * | 12/2006 | Tanaka et al. ........ 701/36 |
| 7,344,205 | B2 * | 3/2008 | Kamiya et al. ........ 303/124 |
| 7,706,944 | B2 * | 4/2010 | Tanaka et al. ........ 701/41 |
| 2006/0015231 | A1 * | 1/2006 | Yoshimura et al. ..... 701/48 |
| 2007/0083318 | A1 * | 4/2007 | Parikh ............... 701/96 |

FOREIGN PATENT DOCUMENTS

| DE | 195 32 331 | 3/1997 |
| DE | 102 15 009 | 10/2003 |
| DE | 102 38 525 A1 | 3/2004 |
| DE | 103 38 255 | 3/2004 |
| EP | 1 361 139 | 11/2003 |

* cited by examiner

*Primary Examiner* — Paul N Dickson
*Assistant Examiner* — Robert A Coker
(74) *Attorney, Agent, or Firm* — RatnerPrestia

(57) ABSTRACT

A method for assisting a driver when parking or maneuvering a motor vehicle having at least one driver assistance system and a vehicle safety system is provided. The method includes the steps of detecting the surroundings and calculating a desired path in a calculation model, in which the differences in traveling distance between the individual wheels are monitored and determined by means of the vehicle safety system. The desired path is predicted in a calculation model by means of the differences in traveling distance, and detection of the surroundings is carried out by means of the driver assistance system. Furthermore, a system which is suitable to implement the method is provided.

14 Claims, No Drawings

METHOD AND SYSTEM FOR ASSISTING A DRIVER WHEN PARKING OR MANEUVERING A MOTOR VEHICLE

This application is the U.S. national phase application of PCT International Application No. PCT/EP2006/069937, filed Dec. 19, 2006, which claims priority to German Patent Application No. DE102005062371.9, filed Dec. 23, 2005, German Patent Application No. DE102005062369.7, filed Dec. 23, 2005, German Patent Application No. DE102005062367.0, filed Dec. 23, 2005, German Patent Application No. DE102006055847.2, filed Nov. 27, 2006, German Patent Application No. DE102006060456.3, filed Dec. 19, 2006, and German Patent Application No. DE102006060457.1, filed Dec. 19, 2006, the contents of such applications being incorporated by reference herein.

BACKGROUND OF THE INVENTION

1. Field of the Invention

The present invention relates to a method and a system for assisting a driver when parking or maneuvering a motor vehicle, which has at least one driver assistance system and a vehicle safety system.

2. Description of the Related Art

Ambience detection sensors are frequently employed in the motor vehicle technology in order to monitor the distance of a motor vehicle from a stationary or movable obstacle such as a pedestrian, e.g. when entering a parking gap, and to indicate to the driver of the motor vehicle the distance from the obstacle optically or audibly, among others, by way of a corresponding display means. Likewise, the distances from the advancing or following traffic participants are monitored when driving rapidly e.g. on a superhighway or when driving slowly in a convoy. For this purpose, radar sensors and/or ultrasonic sensors being components of an ambience detection system that is known to the expert in the art are arranged at the front and/or the rear and on the side in order to monitor a lateral range of the motor vehicle.

Ambience detection sensors are employed in combination with a collision avoidance system, a driver assistance system and/or in a vehicle safety system. Vehicle safety systems can be designed as Electronic Brake System (EBS), Engine Management System (EMS), Anti-lock braking system (ABS), Traction Slip Control (TCS), electronic stability program (ESP), electronic differential lock (EDS), Traction Control System (TCS), electronic brake force distribution (EBD) and/or engine stall torque control (MSR).

Furthermore, the radar system can be a component of a likewise known driver assistance system, for example. Driver assistance systems are implemented as electronic accessory parts in vehicles to assist the driver in defined driving situations. In this regard, safety aspects but predominantly enhancing the driving comfort is frequently in the focus of attention. These systems intervene partly autonomously or autonomously into the drive, control (e.g. accelerator, brake) or signaling devices of the vehicle or warn the driver shortly before or during critical situations by appropriate man-machine interfaces.

Such driver assistance systems are e.g. the parking aid (sensor arrays for obstacle detection and cruise control), brake assistance (BAS), speed control, Adaptive Cruise Control or speed control (ACC), ranging alarm system, turning assist, traffic jam assist, lane tracking system, lane keeping assistance/lane assistance (lane departure warning (LDW)), lane keeping support, lane change assistance, lane change support, Intelligent Speed Adaption (ISA)), Adaptive Swiveling Headlight, tire pressure control system, driver state detection, traffic sign detection, platooning, automatic panic stop (ANB), flashing and dimming assistance for the headlamps, night vision system. More particularly, tire pressure monitoring systems are able to infer directly or indirectly tire pressure loss of the vehicle wheels from the measured angular velocity. Tire pressure monitoring systems are described in the following protective rights, i.e. DE 102005042061 A, DE 19721480 A, DE 1194304 A, EP 1206359A, U.S. Pat. No. 6,826,462A, DE 10032605A, EP 0869875A, EP0675812A, the contents of which are a comprised in the present application.

Furthermore, driver assistance systems assist the driver in the parking maneuver, for example, by finding a suitable initial position for the parking maneuver, presetting an appropriate steering angle or an automatic steering intervention in case the steering motion of the driver is not successful. Besides, systems are in the try-out, which carry out an automatic parking maneuver after having previously measured the parking gap. DE 38 13 083 A1, for example, discloses a system of this type which includes four switches for selecting the type of operation, by way of which the driver can indicate the location and the type of the parking gap. More specifically, the driver selects between left-hand parking gap, left-hand parking space, right-hand parking gap or right-hand parking space.

Furthermore, DE 198 09 416 A1 describes a method of an aided parking maneuver of a motor vehicle and a device for implementing the method, in which an all-around sensor system comprising a great number of distance sensors is used to detect objects in close vicinity of the motor vehicle and their distances from the motor vehicle. A subsequent processing device determines from the distance data the size of a potential parking gap, in case of need the type of its environment, as well as a possible strategy for entering the motor vehicle into the potential parking gap. The strategy found is output by a display device to the driver. The conditions for activating the parking assistance system or the parking assistance function indicated in the prior art method, however, are not appropriate to perform a safe, assisted or automatic parking maneuver.

DE 102005006966 A1 describes a method for parking a vehicle in which a parking path of the vehicle consists of a fixed section in the area of the parking gap and a starting path with a starting point at the fixed section. The starting path which is traveled from an initial position until the starting point is calculated in the form of a polynomial. It must be safeguarded in this regard that the vehicle, starting from the initial position, can be steered with a preset yaw angle onto the fixed section of the parking path or into the parking gap.

To this end, the prior art method especially arranges that the vehicle position, the vehicle yaw angle and the vehicle steering angle is used to find out by means of a characteristic field whether the parking gap can be negotiated from a given initial position. The characteristic field is calculated before (offline) and stored in a control unit within the vehicle. In this arrangement, the yaw angle and the steering angle must be respectively saved in the control unit for a great number of possible initial positions for a parking maneuver.

It is known to steer vehicles automatically along a desired path into a parking gap that has been detected before with the aid of ambient sensors. The desired path is typically predefined in the form of polynomials or as a sequence of circular and clothoid arcs, as has been disclosed e.g. in German published application DE 199 400 7 A1. The parameters of the intended desired path are usually calculated beginning with a starting point.

The methods allowing a parallel parking maneuver in a fully automatic or semi-automatic fashion usually execute this process in the subsequent steps:
1. measuring the parking gap when driving past
2. indicating whether the parking gap is sufficient in size, whether a valid starting range for the parking maneuver was reached
3. calculating a path for entering into the parking gap
4. traveling on the path while simultaneously correcting the path
5. maneuvering within the parking gap.

In general, the points 1 to 3 are based exclusively on wheel rotational speed sensors and partly on steering angle sensor means, being used to perform an odometry calculation to determine the position, as well as on sensor means laterally measuring the parking gap when driving past.

Point 4 is largely based on this sensor means. This is why it is only possible at the end of the actual travel traversed that the ultrasonic sensors, which are frequently fitted as a standard nowadays, can be employed for a ranging alarm in order to correct the actual travel. Thus, the distances of the ambient sensors directed to the front and to the rear are only available at point 5.

One problem in this procedure can be seen in the major tolerances in tire dimensions, as a result of which differences in travel with equal wheel rotations can develop in spite of DIN standards being observed. In addition, the traveling distances and, thus, the wheel rolling circumferences vary also depending on the depth of profile and inflation pressure during the driving maneuver, what generally takes place in long-term processes. Further inaccuracies develop from errors in the steering angle, e.g. due to play and torsion in the steering drive and the steering linkage, as well as the ambient sensors and their orientation.

It is an object of the invention to provide a method allowing improvement of the determination of a desired path for different driving maneuvers such as parking or ranging maneuvers.

SUMMARY OF THE INVENTION

According to aspects of the invention, this object is achieved by a method for assisting a driver when parking or maneuvering a motor vehicle which has at least one driver assistance system and a vehicle safety system comprising the steps of detecting the surroundings and calculating a desired path in a calculation modal, wherein the differences in traveling distance between the individual wheels are monitored and determined by means of the vehicle safety system, the desired path is predicted in a calculation model by means of the differences in traveling distance, and detection of the surroundings is carried out by means of the driver assistance system.

The basic idea of the invention resides in the combination of a vehicle safety system such as an ABS/ESP system with a tire pressure monitoring system and a driver assistance system such as an ACC system and a parking aid system in order to improve the accuracy in the calculation of proposed desired paths. This object is achieved in that the items of information of the individual systems are made use of in each case for the mutual securing and examining of information that is output by a single system. To manage these manifold tasks, the systems are equipped with potential microcomputers which execute control programs for the respective tasks. It is frequently required to remember data of past driving situations in order to judge the driving performance. It is possible in this respect either to save all accumulated current data in defined intervals, or to register average values, maximum values, minimum values and standard deviations for interesting physical parameters or quantities calculated therefrom (input quantities).

Further advantages, special features and suitable improvements of the invention can be seen in the following description of preferred embodiments.

DETAILED DESCRIPTION OF THE PREFERRED EMBODIMENTS

A favorable improvement of the method is characterized in that, as a traveling distance of a wheel, a respective wheel rolling circumference ($U_i$) of a wheel is determined by means of at least one vehicle safety system, and the determined wheel rolling circumferences ($U_i$) of the individual wheels are evaluated to find out the differences in the wheel rolling circumferences.

It is provided in another advantageous embodiment of the invention that the differences in the wheel rolling circumferences between the individual wheels are monitored by means of an ABS system and/or ESP system and an indirect and/or direct tire pressure monitoring system as vehicle safety system.

According to another particularly favorable embodiment, the wheel rolling circumference ($U_1$) of the right front wheel is related to the wheel rolling circumference ($U_2$) of the left front wheel and the wheel rolling circumference ($U_3$) of the left rear wheel is related to the wheel rolling circumference ($U_4$) of the right rear wheel in order to determine the differences in the wheel rolling circumferences.

According to another particularly favorable embodiment, the wheel rolling circumference ($U_1$) of the right front wheel is related to the wheel rolling circumference ($U_3$) of the right rear wheel compared to the wheel rolling circumference ($U_2$) of the left front wheel being related to the wheel rolling circumference ($U_4$) of the right rear wheel in order to determine the differences in the wheel rolling circumferences.

Alternatively, the wheel rolling circumference ($U_1$) of the right front wheel can be related to the wheel rolling circumference ($U_3$) of the right rear wheel compared to the wheel rolling circumference ($U_2$) of the left front wheel being related to the wheel rolling circumference ($U_4$) of the right rear wheel in order to determine the difference in the wheel rolling circumferences.

According to another especially advantageous embodiment, the absolute wheel rolling circumferences ($U_i$) are determined and/or learnt during one or more special driving maneuvers.

In still another especially advantageous embodiment, the absolute wheel rolling circumferences ($U_i$) are determined and/or learnt during one or more, in particular numerous, parking maneuvers and/or ranging maneuvers of the vehicle.

In another especially advantageous embodiment still, the absolute wheel rolling circumferences ($U_i$) are determined and learnt during straight travel of the vehicle in forward or backward directions, or in the determination of the absolute wheel rolling circumference ($U_i$) as a parameter of a calculation model, straight travel movements of the vehicle in forward or backward directions are taken into account to a stronger degree than driving movements with a steering angle unequal zero degrees approximately.

According to another advantageous embodiment of the invention, the absolute wheel rolling circumferences ($U_i$) and/or the wheel rolling circumference differences between the wheels are determined and learnt when this is initiated by the driver, in particular by activating a reset key, or when a change at the tires or wheels is detected.

In another especially advantageous embodiment, the division errors of an encoder of a wheel rotational speed sensor are determined and taken into consideration for the correction of the wheel rotational speed signal ($\square_i$).

In another embodiment, the method is implemented in a system which consists of at least one driver assistance system and at least one vehicle safety system, with the driver assistance system being an ACC system, and with a tire pressure monitoring system and an ABS system being used as vehicle safety systems, with the ACC system, the tire pressure monitoring system and the ABS system interacting by way of wired or wireless data lines and outputting information to the driver by way of one joint man-machine interface.

The method of the invention is started, i.e. the driver must reset the system e.g. by way of a key (reset) when the tire pressures have been adapted or tires of wheels have been exchanged, and a learning period takes place after the reset. It is envisaged at each time of the method that the method of the invention or the tire pressure monitoring system is started by a possible reset, e.g. in the form of a key or a menu item in the on-board computer in order to display any changes at the tires detected by the driver to the systems. The wheel rolling circumferences $U_i$ are newly determined and newly learnt after each reset.

The method of the invention is used to preferably determine/learn the test variables (DIAG, SIDE, AXLE) simultaneously. These mentioned variables represent only one possible example of a set of parameters. According to aspects of the invention, further sets of parameters are feasible, which allow inferring the wheel rolling circumferences $U_i$. In order to save computing capacity of the employed processor/microcomputer and the band width allocation on the corresponding wired and/or mobile bus systems between the systems, the test variables (DIAG, SIDE, AXLE) are determined and learnt consecutively in another preferred embodiment.

The rolling circumference differences ($\Delta$DIAG, $\Delta$SIDE, $\Delta$AXLE) between the actually established and the learnt test variables (DIAG, SIDE, AXLE) preferably are determined in identical speed intervals, and/or wheel torque intervals, and/or lateral acceleration intervals. It is furthermore preferred that the learning operation takes place at the prescribed tire nominal pressure.

The variations of the rolling circumference are determined in a first preferred embodiment of the method of this invention. Three test variables (DIAG, SIDE, AXLE) are determined simultaneously or consecutively to this end, and quantities are included in each test variable (DIAG, SIDE, AXLE), which describe the rotational movements of the wheels such as the times of rotation of a wheel rotation, the rolling circumference, etc. The test variables basically consist of a quotient, the numerator and denominator of which contain in each case the sum of two variables describing the wheel rotations. The numerator of the test variable DIAG contains, for example, the sum of the variables of the wheel rotation of the two diagonally opposite wheels (e.g. left front wheel and right rear wheel), while the denominator indicates the sum of the remaining variables of the wheel rotations (e.g. front right wheel and left rear wheel). With respect to the test variable SIDE, the numerator e.g. contains the variables of the wheel rotations of a vehicle side (e.g. right front wheel and right rear wheel as well as left front wheel and left rear wheel), while with respect to the test variable AXLE, the numerator contains the variables of the wheel rotations of the wheels of one axle (e.g. right front wheel and left front wheel). The denominators are respectively produced from the remaining variables of the wheel rotations. These test variables are defined in various speed intervals, wheel torque intervals, and lateral acceleration intervals or yaw rate intervals. Further, rolling circumference differences ($\Delta$DIAG, $\Delta$SIDE, $\Delta$AXLE) between actual and learnt values are determined. These rolling circumference differences are consequently determined also in the intervals from an actual value and the learning value pertaining to the actual interval.

In general, differences in travel at one tire or several tires are determined by evaluating the rolling circumference differences $\Delta$DIAG, $\Delta$SIDE and $\Delta$AXLE. In a particularly simple embodiment, the following condition is evaluated:

$$\text{Max1}\{|\Delta\text{DIAG}|,|\Delta\text{SIDE}|,|\Delta\text{AXLE}|\}+$$

$$\text{Max2}\{|\Delta\text{DIAG}|,|\Delta\text{SIDE}|,|\Delta\text{AXLE}|\}>2*S_{\mathit{eff}} \quad (1)$$

with Max1 representing the highest value and Max2 representing the second highest value out of the quantity of the amounts of the differences of the three considered rolling circumference differences $\{|\Delta\text{DIAG}|, |\Delta\text{SIDE}|, \Delta|\text{AXLE}|\}$.

The rolling circumference differences ($\Delta$DIAG, $\Delta$SIDE, $\Delta$AXLE) are interpreted in such a manner that it is possible to determine the individual components of the rolling circumference variations $\Delta U_i$ for the different tires of the vehicle. In this arrangement, the values $\Delta U_i$ describe the extent of the individual rolling circumference deviations at any one of three wheels i related to the fourth wheel j. $\Delta U_j=0$ consequently applies to the fourth wheel j. Hence, the relation reads:

$$\{\Delta U_i, i=1,2,3\}=f(\Delta\text{DIAG},\Delta\text{SIDE},\Delta\text{AXLE})$$

Which wheel $j\neq i$ has experienced the minimum variation and, hence, becomes the reference quantity, is likewise the result of this consideration and will be explained in detail in the following.

First, the exact procedure of determining the $\Delta U_i$-values is explained in detail. An auxiliary quantity $U_i$ is initially introduced which describes the rolling circumference variation at a position i related to the learnt condition. The wanted variable $\Delta U_i$ designates, however, the rolling circumference variation $U_i$ at the position i related to the rolling circumference variation $U_j$ at the position with the minimum rolling circumference variation j, hence, $\Delta U_i=U_i-U_j$ applies. To calculate the components of the rolling circumference variations $U_i$, allocated to the individual wheel position, the following linear combination is reviewed:

$$(\Delta\text{DIAG},\Delta\text{SIDE},\Delta\text{AXLE})^T=\Sigma(U_i*Ri) \text{ with } i=0\ldots 3 \quad (2)$$

(with $i=0\ldots 3$ meaning front left wheel, front right wheel, right rear wheel, left rear wheel)

In this definition, the chosen signs of the vectors take into account that only rolling circumference reductions will have to be expected during operation, and these rolling circumference reductions are defined as positive $U_i$.

The equation system (2) comprises three equations with the four unknown quantities $U_i$ and, thus, cannot be solved without additional condition. When it is initially presupposed that the wheel position j having the lowest pressure loss is known, the following substitution can take place:

$$\Delta U_i=U_i-U_j \text{ with } U_j=\text{Min}(\{U_i\})$$

$$(\Delta\text{DIAG},\Delta\text{SIDE},\Delta\text{AXLE})^T=\Sigma(\Delta U_i*Ri) \text{ with } i=0\ldots 3, \; i\neq j \quad (3)$$

As the position j is unknown, the equation system must be solved four times by varying j with $j=0\ldots 3$. Out of the quantity of the four possible solutions $L_j$ $$L_j=\{\Delta U_i, i=0\ldots 3, i\neq j\}_j \; j=0\ldots 3$$

only the solution $L_j$ is correct, for which all $\Delta U_i$ adopt positive values (as fixed by definition), i.e.

$L_j=L_j$ solution: $\Delta U_i \geqq 0$ for $i=0 \ldots 3$, $i \neq j$

Thus, the correct solution $L_j$ comprises the individual components of the rolling circumference variations.

Since a vehicle can mostly be equipped with a great number of different sizes of tires and types of tires, it is suitable to take this fact into account in the method of the invention. This consideration occurs in a first step of the method of the invention by a learning phase in which the tire properties of the tires used are learnt. The learning of the individual properties such as the pressure sensitivity ($df_p/dp$) of each tire on the vehicle is executed e.g. by utilizing the pressure variations which occur when the tires heat up or cool down in operation. The criteria (DIAG, SIDE, AXLE, $\Delta f_p$) for the wheel rotations and the oscillation properties are learnt in speed ranges and wheel torque ranges. The criteria (DIAG, SIDE, AXLE, $\Delta f_p$) are also evaluated speed-responsively and wheel-torque responsively.

In another favorable embodiment, the axlewise determination of the rolling circumference differences for calculating the 'path curve' in the parking maneuver is performed, i.e. on which curve radius the vehicle is moving. As this occurs, the axlewise rolling differences left/right are defined as FRONT and REAR characteristic quantities. The characteristic quantities are initially determined for straight travel, and it is then possible to infer the currently traveled curve radius from the actual $\Delta$FRONT and $\Delta$REAR by using the track width and, hence, infer the path curve during the parking maneuver, or the current vehicle-related relationship between steering angle and curve radius can be established, which is used as an input quantity for the parking system.

Either these characteristic quantities are determined directly in the indirect tire pressure control system, or they are established out of an existing tire pressure control system in approximation from (DIAG, SIDE) (e.g. FRONT=(DIAG+SIDE)/2, REAR=(DIAG−SIDE)/2). This determination could take place continuously during driving, pressure losses would thus be considered automatically. It is preferred that the continuous learning operation takes place during straight travel, at low speeds and for the driving axle at low driving torques.

Since the type of tire is usually unknown and a great number of tire dimensions and types of tires may be used in normal vehicles, it is required that a system can process this fact.

After the wheel rolling circumference differences have been established, the information is sent to the parking aid system, and a desired path which has possibly been calculated already is corrected accordingly in view of the wheel rolling differences.

It is provided in another preferred embodiment to initially determine the approximate frequency position of the torsion natural frequency $f_p$ in a preceding learning phase. In a temporally brief first learning phase, the rough position of the torsion natural frequency $f_p$ in a wide frequency range (e.g. 20 to 60 hertz) is initially determined with a coarse frequency resolution, e.g. one hertz (corresponds to 41 frequency steps). Subsequently, the relevant frequency range for the actual learning phase is fixed, e.g. at $f_p-15$ hertz$<f<f_p+5$ hertz, and now a frequency resolution of 0.5 hertz is possible in order to utilize the same number of frequency steps.

When e.g. a tire in a largely cold state is initially learnt at a vehicle speed of 40 km/h and is then operated again in a warm state at 40 km/h after a long travel on the superhighway, an increase in the torsion natural frequency due to the higher inflation pressure can be detected. The sensitive tire mentioned in the example hereinabove then shows a shift of the torsion natural frequency by roughly 2.4 hertz, the insensitive tire only by roughly 1.2 hertz. In case the tire cools down again e.g. as a result of beginning rain, the effect will be exactly reversed.

A decisive condition for the utilization of this effect can thus be seen in the possibility of exactly detecting when the tires are heated or when the tires are cold. In this arrangement, the method of the invention makes use of the effect that heating and cooling actions always refer to all four tires on the vehicle, i.e. if there is a uniform increase of the torsion natural frequency $f_p$ on all four wheels, one can assume that the tires are warm. However, if the torsion natural frequency $f_p$ decreases on all four wheels simultaneously and stays at a value, one can assume cold tires e.g. as a result of rain or general cooling. However, if the torsion natural frequency $f_p$ decreases on all four wheels simultaneously and does not stay at a value, one must assume simultaneous pressure loss on all four wheels. Changes which refer to individual tires only are not utilized. In this respect, not only the absolute value of the torsion natural frequencies is taken into consideration, but especially the behavior of the torsion natural frequencies as a function of time is assessed.

In another design of the embodiment, the outside temperature is used in addition in order to be able to evaluate the current temperature level compared to the temperature level at the time of the reset, as well as the heating potential depending on the state of the surroundings. If the method of the invention is implemented in a 'brake control device', the temperature which has been measured by means of the sensor that is already provided in the 'brake control device' can be used for the outside temperature. Otherwise, it is also possible to use the outside temperature of the vehicle bus, e.g. CAN. Furthermore, the flexing energy of the tires is evaluated during each individual ignition cycle, which basically depends on the speed profile (e.g. integration of the rotation energies). The expected pressure increase can be estimated based thereon.

In another embodiment, the vehicle immobilization time prior to the current ignition cycle is additionally taken into account in order to evaluate on a more reliable basis whether the tires were warm or cold at start-up. This immobilization time can be determined e.g. by a trailing action of the processor by way of the 'ignition off' signal. In practical operations, a trailing action of a maximum of 30 minutes is presumably sufficient for reasons of careful treatment of the vehicle battery. Or the clock time is read in directly from the vehicle bus, e.g. CAN. To support the assumption of cooling of the tires due to rain, signals of a rain sensor can be read in by the vehicle bus in addition.

In a favorable embodiment, the travel covered, e.g. as a change of the distance $d_j$ to a vehicle parking behind, is measured by a distance sensor directed to the rear when a vehicle drives back straight in a parking gap. This travel is related to the wheel rotations measured by means of the wheel rotational speed sensor, thereby determining the absolute wheel rolling circumferences $U_i$ of the tires.

It is especially preferred that the wheel rotational speeds $\omega_i$ and the distances $d_j$ are combined with each other in driving situations with a steering angle of roughly zero degrees, i.e. during roughly straight travel. It is thus ensured that the 'air line' measured by the distance sensors indeed corresponds to the traveled path length.

When the wheel rolling circumferences $U_i$ are determined using a parameter model, driving situations with a steering angle of roughly zero degrees, i.e. approximate straight travel, are especially considered and weighted, since it is not required in this case to take into consideration steering-angle responsive model errors for the predicted and, thus, calculated path curve.

A sufficient rate of precision of the detection of the surroundings, in particular in forward and rearward directions, is necessary for determining the wheel rolling circumferences $U_i$ as exactly as possible. It is likewise advantageous for improving the achieved accuracy when the division error of each encoder of the wheel rotational speed sensors is learnt during driving. The learnt division errors are then respectively used for the correction of the wheel rotational speeds $\omega_i$. A correction is relevant especially in the evaluation of fractions of wheel rotations.

In another embodiment, the length of the parking gap is measured by the distance sensors being directed to the front and to the rear in a ranging maneuver within the parking gap as well as in the final parking position. The discrepancy between the length of the parking gap which is predicted according to the calculation model with assumed rolling circumferences $U_i$ and the measured parking gap length can be memorized. With a factor indicative of the reliability of the measured distance values, it is possible to adapt the wheel rolling circumferences $U_i$ in order to be able to make a more precise prediction and, hence, to enter the parking gap in a more exact fashion in the next parking maneuver.

It is favorable to determine the wheel rolling circumferences $U_i$ by long-term observation, e.g. by way of a great number of parking and/or ranging maneuvers, or to substitute the precisely stated wheel rolling circumferences $U_i$ which are newly determined during the learning phase for the preset values for the wheel rolling circumferences $U_i$.

The method of the invention is preferred to be used with the known indirect tire pressure control systems, which evaluate relative rolling circumference changes, for example. The most important advantages involve the enhanced robustness by plausibilisation of the signals, and increased availability of the overall system. The established absolute wheel rolling circumferences $U_i$ can also be taken for the identification of the type of tire.

In another embodiment, it is provided that the driver informs the vehicle about which type of tire and, hence, which tire rolling circumference is mounted by way of a man-machine interface, which is preferably designed as a touch screen and is used for display purposes and for universal service purposes, in case of need also for other devices such as a navigation unit, for the input and output of data. This input allows directly using the rolling circumference for initializing the model parameters, and the 'continued learning operation' is performed during the process cycle of the invention since the rolling circumference will change during the driving operation, e.g. due to wear and pressure loss.

Wheel sensors that detect the direction of rotation are provided to determine the wheel rolling circumferences $U_i$ in another embodiment.

The estimated odometry deviations or deviations of the overall system can be refined, safeguarded and/or rendered more plausible by means of additional sensors such as GPS and yaw rate sensor.

The invention claimed is:

1. A method for assisting a driver when parking or maneuvering a motor vehicle, which has at least one driver assistance system and a vehicle safety system, comprising the following steps:
   a) detecting the surroundings; and
   b) calculating a desired path in a calculation model, wherein differences in traveling distance between individual wheels of the motor vehicle are monitored and determined by means of the vehicle safety system, and wherein the desired path is predicted in the calculation model by means of the differences in traveling distance and detection of the surroundings is carried out by means of the driver assistance system.

2. The method as claimed in claim 1,
wherein, as a traveling distance of a wheel, a respective wheel rolling circumference ($U_i$) of at least one wheel is determined by means of at least one vehicle safety system, and the determined wheel rolling circumferences ($U_i$) of the individual wheels are evaluated to find out the differences in the wheel rolling circumferences.

3. The method as claimed in claim 2,
wherein the differences in the wheel rolling circumferences between the individual wheels are monitored by means of the vehicle safety system including at least one of an indirect tire pressure monitoring system, an antilock braking system (ABS), and an electronic stability program (ESP) system.

4. The method as claimed in claim 2,
wherein a wheel rolling circumference ($U_1$) of a right front wheel of the motor vehicle is related to a wheel rolling circumference ($U_2$) of a left front wheel of the motor vehicle, and
a wheel rolling circumference ($U_3$) of a left rear wheel of the motor vehicle is related to a wheel rolling circumference ($U_4$) of a right rear wheel of the motor vehicle in order to determine the differences in the wheel rolling circumferences.

5. The method as claimed in claim 2,
wherein a wheel rolling circumference ($U_1$) of a right front wheel of the motor vehicle is related to a wheel rolling circumference ($U_3$) of a right rear wheel of the motor vehicle compared to the wheel rolling circumference ($U_2$) of the left front wheel being related to the wheel rolling circumference ($U_4$) of the right rear wheel in order to determine the differences in the wheel rolling circumferences.

6. The method as claimed in claim 2,
wherein the wheel rolling circumferences ($U_i$) are determined during one or more special driving maneuvers.

7. The method as claimed in claim 2,
wherein the wheel rolling circumferences ($U_i$) are determined during one or more parking maneuvers of the motor vehicle or one or more ranging maneuvers of the motor vehicle.

8. The method as claimed in claim 2,
wherein the wheel rolling circumferences ($U_i$) are determined during straight travel of the motor vehicle in forward or backward directions.

9. The method as claimed in claim 2,
wherein the wheel rolling circumferences ($U_i$) are determined as a parameter of a calculation model,
wherein the calculation model accounts for straight travel movements of the vehicle in forward or backward directions to a stronger degree than driving movements defined by a steering angle that is unequal to approximately zero degrees.

10. The method as claimed in claim 2,
wherein either the wheel rolling circumferences ($U_i$), or the wheel rolling circumference differences between the wheels are determined upon initiation by a driver of the motor vehicle.

11. The method as claimed in claim 10,
wherein initiation occurs upon activating a reset key, or detection of a change at the tires or wheels.

12. The method as claimed in claim 1,
wherein a division error of an encoder of a wheel rotational speed sensor is determined and taken into consideration for a correction of a wheel rotational speed signal ($\square_i$).

13. A system for implementing the method of claim 1 comprising at least one driver assistance system and at least one vehicle safety system,
wherein the driver assistance system is an adaptive cruise control (ACC) system;
a tire pressure monitoring system and an anti-lock braking system (ABS) are used as vehicle safety systems along with the ACC system; and
the tire pressure monitoring system and the ABS system are configured to interact by way of wired or wireless data lines to output status information to a driver interface of the motor vehicle.

14. A system for assisting a driver when parking or maneuvering a motor vehicle along a desired path, said system comprising:
a driver interface;
a driver assistance system including an adaptive cruise control (ACC) system configured for detecting surroundings of the motor vehicle; and
a vehicle safety system including a tire pressure monitoring system operatively coupled to an anti-lock braking system (ABS) by wired or wireless data lines, wherein the vehicle safety system is configured to determine differences in traveling distance between individual wheels of the motor vehicle along the desired path of the motor vehicle;
wherein the vehicle safety system is configured to output status information to the driver interface of the motor vehicle, and the vehicle safety system is configured to predict a desired path by means of the differences in traveling distance between individual wheels of the motor vehicle.

* * * * *